United States Patent
Koizumi et al.

(10) Patent No.: US 10,239,680 B2
(45) Date of Patent: Mar. 26, 2019

(54) BLISTER PACKAGE CONTAINING THE LAMINATED SHEET AND CONTAINER

(71) Applicant: KYODO PRINTING CO., LTD., Tokyo (JP)

(72) Inventors: Shinichi Koizumi, Tokyo (JP); Hikaru Yamamoto, Tokyo (JP); Tatsuya Ogawa, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 223 days.

(21) Appl. No.: 14/739,698

(22) Filed: Jun. 15, 2015

(65) Prior Publication Data
US 2015/0291337 A1 Oct. 15, 2015

Related U.S. Application Data

(60) Division of application No. 13/778,814, filed on Feb. 27, 2013, now abandoned, which is a continuation of
(Continued)

(30) Foreign Application Priority Data
Sep. 1, 2010 (JP) .................................. 2010-196177

(51) Int. Cl.
*B65D 75/30* (2006.01)
*B65D 75/32* (2006.01)
(Continued)

(52) U.S. Cl.
CPC .............. *B65D 81/264* (2013.01); *B32B 1/02* (2013.01); *B32B 7/12* (2013.01); *B32B 15/08* (2013.01);
(Continued)

(58) Field of Classification Search
None
See application file for complete search history.

(56) References Cited

U.S. PATENT DOCUMENTS 4,120,928 A  10/1978  Furukawa et al.
4,133,802 A * 1/1979  Hachiboshi ............ C08G 69/46
                                                        264/290.2
(Continued)

FOREIGN PATENT DOCUMENTS

CN  101508368 A    8/2009
CN  101528179 A *  9/2009
(Continued)

OTHER PUBLICATIONS

Chinese Office Action from Chinese patent application 201180042073.1, dated Aug. 6, 2014.
(Continued)

*Primary Examiner* — Vivian Chen
(74) *Attorney, Agent, or Firm* — Greenblum & Bernstein, P.L.C.

(57) ABSTRACT

A laminated sheet or a container includes: an absorbing layer absorbing at least one of liquid and gas; a reinforcing layer laminated on the absorbing layer with an adhesive layer interposed therebetween; an aluminum layer laminated on the reinforcing layer with an adhesive layer interposed therebetween; and a barrier layer laminated on the aluminum layer with an adhesive layer interposed therebetween and suppressing entry of at least one of liquid and gas.

8 Claims, 6 Drawing Sheets

Related U.S. Application Data application No. PCT/JP2011/004919, filed on Sep. 1, 2011.

(51) Int. Cl.

| | | |
|---|---|---|
| *B65D 75/36* | (2006.01) |
| *B65D 81/00* | (2006.01) |
| *B65D 81/24* | (2006.01) |
| *B65D 81/26* | (2006.01) |
| *C08K 3/01* | (2018.01) |
| *C08K 3/22* | (2006.01) |
| *C08K 3/24* | (2006.01) |
| *A61J 1/03* | (2006.01) |
| *A61J 1/00* | (2006.01) |
| *B32B 1/02* | (2006.01) |
| *B32B 7/12* | (2006.01) |
| *B32B 15/08* | (2006.01) |
| *B32B 15/082* | (2006.01) |
| *B32B 15/088* | (2006.01) |
| *B32B 15/09* | (2006.01) |
| *B32B 15/20* | (2006.01) |
| *B32B 27/08* | (2006.01) |
| *B32B 27/18* | (2006.01) |
| *B32B 27/30* | (2006.01) |
| *B32B 27/34* | (2006.01) |
| *B32B 27/36* | (2006.01) |
| *B65D 65/14* | (2006.01) |
| *B65D 65/40* | (2006.01) |
| *B32B 15/085* | (2006.01) |
| *B32B 27/32* | (2006.01) |
| *C08K 3/34* | (2006.01) |

(52) U.S. Cl.
CPC .......... *B32B 15/082* (2013.01); *B32B 15/085* (2013.01); *B32B 15/088* (2013.01); *B32B 15/20* (2013.01); *B32B 27/08* (2013.01); *B32B 27/18* (2013.01); *B32B 27/304* (2013.01); *B32B 27/32* (2013.01); *B32B 27/322* (2013.01); *B32B 27/34* (2013.01); *B32B 27/36* (2013.01); *B65D 65/14* (2013.01); *B65D 65/40* (2013.01); *B65D 75/326* (2013.01); *B65D 75/36* (2013.01); *B65D 81/00* (2013.01); *B65D 81/267* (2013.01); *A61J 1/00* (2013.01); *A61J 1/03* (2013.01); *A61J 1/035* (2013.01); *B32B 15/09* (2013.01); *B32B 27/30* (2013.01); *B32B 2250/05* (2013.01); *B32B 2264/10* (2013.01); *B32B 2264/102* (2013.01); *B32B 2307/50* (2013.01); *B32B 2307/518* (2013.01); *B32B 2307/54* (2013.01); *B32B 2307/70* (2013.01); *B32B 2307/7242* (2013.01); *B32B 2307/7244* (2013.01); *B32B 2307/7246* (2013.01); *B32B 2307/7248* (2013.01); *B32B 2307/7265* (2013.01); *B32B 2307/738* (2013.01); *B32B 2307/74* (2013.01); *B32B 2307/758* (2013.01); *B32B 2311/24* (2013.01); *B32B 2327/06* (2013.01); *B32B 2367/00* (2013.01); *B32B 2377/00* (2013.01); *B32B 2439/00* (2013.01); *B32B 2439/70* (2013.01); *B32B 2439/80* (2013.01); *B65D 75/30* (2013.01); *B65D 75/32* (2013.01); *B65D 75/325* (2013.01); *B65D 81/24* (2013.01); *B65D 81/26* (2013.01); *B65D 81/266* (2013.01); *C08K 3/01* (2018.01); *C08K 3/22* (2013.01); *C08K 3/34* (2013.01); *C08K 2003/2227* (2013.01); *Y10T 428/1359* (2015.01); *Y10T 428/31678* (2015.04); *Y10T 428/31681* (2015.04); *Y10T 428/31699* (2015.04); *Y10T 428/31725* (2015.04); *Y10T 428/31786* (2015.04); *Y10T 428/31935* (2015.04)

(56) References Cited

U.S. PATENT DOCUMENTS

| | | | |
|---|---|---|---|
| 4,233,354 A | 11/1980 | Hasegawa et al. | |
| 4,559,266 A | 12/1985 | Misasa et al. | |
| 4,698,195 A | 10/1987 | Okumura et al. | |
| 4,772,652 A | 9/1988 | Yoshifumi et al. | |
| 4,812,534 A | 3/1989 | Blakely | |
| 4,992,410 A | 2/1991 | Cullen et al. | |
| 5,049,624 A * | 9/1991 | Adams | B32B 27/18 |
| | | | 252/186.24 |
| 5,077,109 A | 12/1991 | Lustig et al. | |
| 5,153,038 A | 10/1992 | Koyama et al. | |
| 5,258,233 A | 11/1993 | Mills et al. | |
| 5,281,360 A | 1/1994 | Hong et al. | |
| 5,716,715 A | 2/1998 | Degrassi et al. | |
| 5,747,174 A * | 5/1998 | Kimura | B29C 55/023 |
| | | | 428/480 |
| 5,820,956 A | 10/1998 | Hatakeyama et al. | |
| 5,834,079 A * | 11/1998 | Blinka | B32B 27/18 |
| | | | 428/349 |
| 5,849,380 A | 12/1998 | Kashiba et al. | |
| 6,239,210 B1 | 5/2001 | Kim et al. | |
| 6,270,869 B1 * | 8/2001 | Zeiter | B32B 15/08 |
| | | | 206/531 |
| 6,495,223 B1 * | 12/2002 | Berlin | B32B 27/18 |
| | | | 428/34.2 |
| 6,740,376 B2 | 5/2004 | Oguro et al. | |
| 6,746,772 B2 | 6/2004 | Kashiba et al. | |
| 6,777,479 B1 | 8/2004 | Bernard et al. | |
| 6,933,055 B2 | 8/2005 | Share et al. | |
| 6,946,175 B2 | 9/2005 | Yang et al. | |
| 7,110,261 B2 | 9/2006 | Lee et al. | |
| 7,186,464 B2 * | 3/2007 | Laplante | C08L 29/04 |
| | | | 428/474.4 |
| 7,244,484 B2 | 7/2007 | Share et al. | |
| 7,375,154 B2 | 5/2008 | Stafford et al. | |
| 7,854,994 B2 | 12/2010 | Henderson-Rutgers et al. | |
| 7,862,869 B2 | 1/2011 | Papenfuss et al. | |
| 10,010,480 B2 * | 7/2018 | Hosoi | A61J 1/03 |
| 2001/0008662 A1 | 7/2001 | Blinka et al. | |
| 2003/0203141 A1 | 10/2003 | Blum et al. | |
| 2004/0234797 A1 | 11/2004 | Schwark et al. | |
| 2005/0085577 A1 * | 4/2005 | Ching | A23L 3/3418 |
| | | | 524/394 |
| 2006/0014036 A1 * | 1/2006 | Kendig | B32B 1/02 |
| | | | 428/522 |
| 2007/0160789 A1 * | 7/2007 | Merical | B32B 7/02 |
| | | | 428/35.7 |
| 2008/0241521 A1 * | 10/2008 | Solovyov | B32B 7/12 |
| | | | 428/334 |
| 2009/0013760 A1 | 1/2009 | Chiba et al. | |
| 2009/0022434 A1 | 1/2009 | Chiba et al. | |
| 2009/0192269 A1 * | 7/2009 | Talkowski | C08L 67/02 |
| | | | 525/195 |
| 2009/0294319 A1 | 12/2009 | Nägeli et al. | |
| 2009/0308780 A1 * | 12/2009 | Nonomura | B65D 81/266 |
| | | | 206/524.4 |
| 2010/0189942 A1 * | 7/2010 | Tamura | B32B 27/08 |
| | | | 428/35.8 |
| 2011/0017611 A1 * | 1/2011 | Menozzi | A23L 3/3436 |
| | | | 205/763 |
| 2013/0153459 A1 * | 6/2013 | Yoshita | B65D 75/326 |
| | | | 206/530 |
| 2013/0168270 A1 * | 7/2013 | Koizumi | B65D 81/267 |
| | | | 206/204 |
| 2016/0193585 A1 * | 7/2016 | Koizumi | B29C 47/14 |
| | | | 206/484 |
| 2017/0051129 A1 * | 2/2017 | Sakamoto | C08J 5/18 |

(56) References Cited

U.S. PATENT DOCUMENTS

| | | | |
|---|---|---|---|
| 2018/0170008 A1* | 6/2018 | Hosoi | B32B 15/082 |
| 2018/0186533 A1* | 7/2018 | Hosoi | B32B 15/08 |

FOREIGN PATENT DOCUMENTS

| | | | |
|---|---|---|---|
| JP | 2004-058515 | | 2/2004 |
| JP | 2006-327690 | | 12/2006 |
| JP | 2006-327690 A | * | 12/2006 |
| JP | 2006-334819 | | 12/2006 |
| JP | 3983131 | | 9/2007 |
| JP | 2008-155593 | | 7/2008 |
| JP | 2008-207818 | | 9/2008 |
| JP | 2008-207818 A | * | 9/2008 |
| KR | 10-0922490 | | 10/2009 |
| WO | 2006/115264 | | 11/2006 |
| WO | WO 2006/115264 A | * | 11/2006 |
| WO | WO 2012/029899 A | * | 3/2012 |

OTHER PUBLICATIONS

Chinese Office Action from Chinese patent application No. 201180042073.1 dated Oct. 31, 2014.

Schimtz, Peter et al., "Films." Ullmann's Encyclopedia of Industrial Chemistry, 5th Ed., vol. A11 (1988), pp. 85-110.

WIPO Written Opinion for PCT/JP2011/004919, dated Oct. 18, 2011.

Search Report from International Application No. PCT/JP2011/004919, dated Oct. 18, 2011.

Korean Office action, dated Jan. 16, 2014.

Chinese Office action, dated Jan. 13, 2014.

Office action (Decision of Refusal) in Korean Appln. No. 10-2013-7005699, dated Jul. 29, 2014.

Notice of reasons for rejection for application No. 2012-531702, dated May 19, 2015.

Japanese Notice of Allowance issued with respect to application No. 2012-531702, dated Aug. 18, 2015.

Taiwanese Office action issued with respect to application No. 100131429, dated Aug. 7, 2015.

Office Action issued in Europe Counterpart Patent Appl. No. 11821344.6, dated Sep. 8, 2017.

* cited by examiner

| | FIRST FILM | SECOND FILM | THIRD FILM | FOURTH FILM | FIFTH FILM | SIXTH FILM | SEVENTH FILM | EIGHTH FILM | NINTH FILM |
|---|---|---|---|---|---|---|---|---|---|
| FILM TYPE | OPP | PET | PET | CAST POLYAMIDE | BIAXIALLY-ORIENTED POLYAMIDE | BIAXIALLY-ORIENTED POLYAMIDE | PVC | OPP | CPP |
| THICKNESS | 40 | 25 | 12, 25 | 25 | 15, 25 | 15 | 60 | 20 | 25 |
| TRADE NAME | PYLEN-OT P2002 | TEFLEX FT3PE | E5100 | DIAMIRON C-Z | BONYL W | HARDEN N2102 | VINYFOIL C-455 | U-1 | PYLEN-CT P1128 |
| TENSILE FRACTURE STRENGTH MPa — MD | 140 | 160 | 230 | 150 | 260 | 220 | 85 | 130 | 54 |
| TENSILE FRACTURE STRENGTH MPa — TD | 360 | 170 | 240 | 140 | 270 | 290 | 55 | 265 | 34 |
| TENSILE FRACTURE ELONGATION % — MD | 220 | 220 | 100 | 410 | 120 | 110 | 140 | 160 | 390 |
| TENSILE FRACTURE ELONGATION % — TD | 40 | 210 | 90 | 430 | 110 | 65 | 170 | 45 | 560 |

FIG.4

| | BARRIER LAYER | (THICKNESS: μm) | ALUMINUM LAYER (THICKNESS: μm) | REINFORCING LAYER | (THICKNESS: μm) | ABSORBING LAYER (THICKNESS: μm) | |
|---|---|---|---|---|---|---|---|
| EXAMPLE 1 | BIAXIALLY-ORIENTED POLYAMIDE | 15 | AL 40 | BIAXIALLY-ORIENTED POLYAMIDE | 15 | | |
| EXAMPLE 2 | BIAXIALLY-ORIENTED POLYAMIDE | 15 | | BIAXIALLY-ORIENTED POLYAMIDE | 25 | | |
| EXAMPLE 3 | BIAXIALLY-ORIENTED POLYAMIDE | 15 | | PET | 25 | | |
| EXAMPLE 4 | BIAXIALLY-ORIENTED POLYAMIDE | 15 | | PVC | 60 | | |
| EXAMPLE 5 | BIAXIALLY-ORIENTED POLYAMIDE | 25 | | BIAXIALLY-ORIENTED POLYAMIDE | 25 | | |
| EXAMPLE 6 | PET | 12 | | BIAXIALLY-ORIENTED POLYAMIDE | 15 | | |
| EXAMPLE 7 | BIAXIALLY-ORIENTED POLYAMIDE | 15 | | BIAXIALLY-ORIENTED POLYAMIDE | 15 | MOISTURE ABSORBING FILM | 50 |
| EXAMPLE 8 | PET | 25 | | PET | 25 | | |

FIG.5

| | BARRIER LAYER (THICKNESS: μm) | | ALUMINUM LAYER (THICKNESS: μm) | | ALTERNATIVE LAYER (THICKNESS: μm) | | ABSORBING LAYER (THICKNESS: μm) | |
|---|---|---|---|---|---|---|---|---|
| COMPARATIVE EXAMPLE 1 | BIAXIALLY-ORIENTED POLYAMIDE | 15 | AL | 40 | OPP | 40 | | |
| COMPARATIVE EXAMPLE 2 | CAST POLYAMIDE | 25 | | | CAST POLYAMIDE | 25 | | |
| COMPARATIVE EXAMPLE 3 | BIAXIALLY-ORIENTED POLYAMIDE | 15 | | | OPP | 20 | | |
| COMPARATIVE EXAMPLE 4 | BIAXIALLY-ORIENTED POLYAMIDE | 15 | | | CPP | 25 | | |
| COMPARATIVE EXAMPLE 5 | BIAXIALLY-ORIENTED POLYAMIDE | 15 | | | NONE | — | MOISTURE ABSORBING FILM | 50 |

BLISTER PACKAGE CONTAINING THE LAMINATED SHEET AND CONTAINER

The present application is a Divisional of U.S. application Ser. No. 13/778,814, filed Feb. 27, 2013, abandoned, which is a Continuation of International Patent Application No. PCT/JP2011/004919, filed Sep. 1, 2011, which claims priority to Japanese Application No. 2010-196177 filed Sep. 1, 2010. The disclosures of U.S. application Ser. No. 13/778,814 and PCT/JP2011/004919 are incorporated by reference herein in their entireties.

TECHNICAL FIELD

The present invention relates to a laminated sheet having a plurality of layers laminated therein, a container having a recessed holding space formed therein, and a package holding a solid preparation therein.

DESCRIPTION OF THE RELATED ART

A laminated sheet of this type is used for a container (a pocket product, a cover, and the like) of a medicine, for example.

Medicines are taken or applied for treating a disease or an injury or for maintaining and promoting the health.

Here, a powder medicine is enclosed in a thin paper bag, a thin film bag, or the like. On the other hand, a granular or capsule-shape medicine is sometimes put into production as a blister package called a PTP (Press Through Package).

The blister package has a granular or capsule-shaped medicine held therein. The medicine inside can be visually confirmed from the outside through a transparent container. Then, the medicine, together with the transparent container, is pressed toward a cover side with fingers and the like, and thereby an aluminum base material as a cover is torn to then make it possible to take the inside medicine out of the blister package.

Here, there are several types of medicines, in which a medicine having low moisture resistance and a medicine having a strong smell are also included. Thus, an adsorbing layer having an adsorbent is sometimes disposed inside the container (laminated sheet).

Further, in the medicines, there are also included medicines vulnerable to moisture and ultraviolet light from the outside. In such a case, the container is sometimes made opaque.

SUMMARY OF THE INVENTION

The first invention to be disclosed herein is a laminated sheet. This laminated sheet includes: an absorbing layer absorbing at least one of liquid and gas; a reinforcing layer laminated on the absorbing layer with an adhesive layer interposed therebetween; an aluminum layer laminated on the reinforcing layer with an adhesive layer interposed therebetween; and a barrier layer laminated on the aluminum layer with an adhesive layer interposed therebetween and suppressing entry of at least one of liquid and gas.

The second invention to be disclosed herein is a container having a recessed holding space formed therein. This container includes: an absorbing layer absorbing at least one of liquid and gas; a reinforcing layer laminated on the absorbing layer with an adhesive layer interposed therebetween; an aluminum layer laminated on the reinforcing layer with an adhesive layer interposed therebetween; and a barrier layer laminated on the aluminum layer with an adhesive layer interposed therebetween and suppressing entry of at least one of liquid and gas.

The third invention to be disclosed herein is a package holding therein a solid preparation (from which one containing solifenacin succinate or 1-{[(alpha-isobutanoyloxy-ethoxy)carbonyl]aminomethyl}-1-cyclohexaneacetic acid is excluded). This package includes: a container having a recessed holding space holding the solid preparation therein formed therein; a cover covering the holding space and provided with airtightness; an absorbing layer provided, in the container, on a side where the solid preparation is held and absorbing at least one of liquid and gas; a reinforcing layer provided in the container and laminated on the absorbing layer with an adhesive layer interposed therebetween; an aluminum layer provided in the container and laminated on the reinforcing layer with an adhesive layer interposed therebetween; and a barrier layer provided in the container, laminated on the aluminum layer with an adhesive layer interposed therebetween, and suppressing entry of at least one of liquid and gas.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings.

DETAILED DESCRIPTION

Hereinafter, embodiments of a laminated sheet, a container, and a package will be explained.

Figure 1:
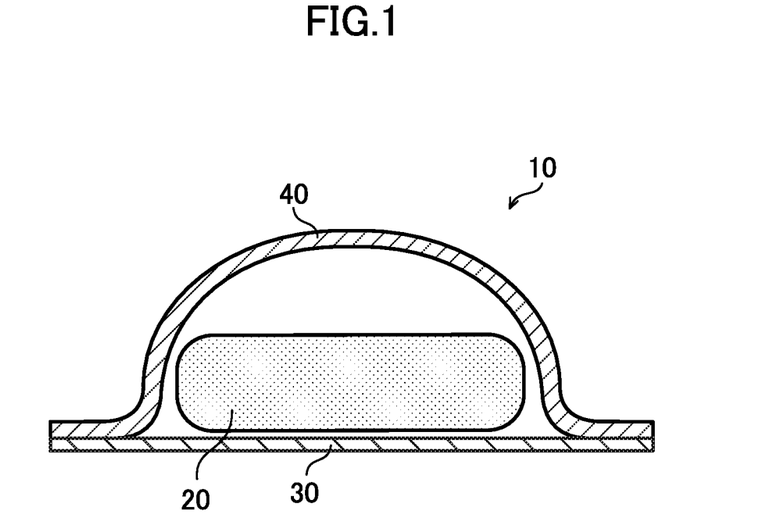
FIG. 1 is a schematic cross-sectional view showing a blister package according to one embodiment.

FIG. 1 is a schematic cross-sectional view showing a blister package according to one embodiment.

A blister package 10 is cited as one example of the package, and has a solid preparation 20 such as a granular or capsule-shaped medicine held therein.

The solid preparation 20 is a content of a granular or capsule-shaped medicine or the like. With respect to the solid preparation 20, a desired material or one in which desired materials are combined appropriately can be applied. However, from the solid preparation 20, one containing solifenacin succinate or 1-{[(alpha-isobutanoyloxyethoxy) carbonyl]aminomethyl}-1-cyclohexaneacetic acid is excluded.

The blister package 10 includes a cover 30 to be a base. The cover 30 is a member covering the solid preparation 20 and provided with airtightness. For the cover 30, PVC (PolyVinyl Chloride), EVA (Ethylene Vinyl Acetate) coat AL (aluminum), or the like can be used.

Further, the blister package 10 includes a container 40. The container 40 is that the laminated sheet having a plurality of layers laminated therein is formed into a dome shape in a forming machine or the like. The container 40 encloses and protects the inside solid preparation 20. In the container 40, a recessed holding space holding the solid preparation 20 therein is formed. As a forming method in which the container 40 is formed into a dome shape (a method of forming the recessed holding space), PTP forming methods such as a flat-plate type air-pressure forming method, a plug-assist air-pressure forming method, a drum type vacuum forming method, and a plug forming method can be cited. The cover 30 and the container 40 can be bonded in a manner that their inner surfaces are overlapped each other to be heat sealed. In the case when adhesiveness is low even though the above is applied, on either the cover 30 or the container 40, an adhesive layer or a heat sealing resin layer may also be further formed. Then, the solid preparation 20 inside the blister package 10 is pressed toward the cover 30 side from the container 40 side with fingers and the like, and thereby the cover 30 is torn, and then the solid preparation 20 can be taken out.

Figure 2:
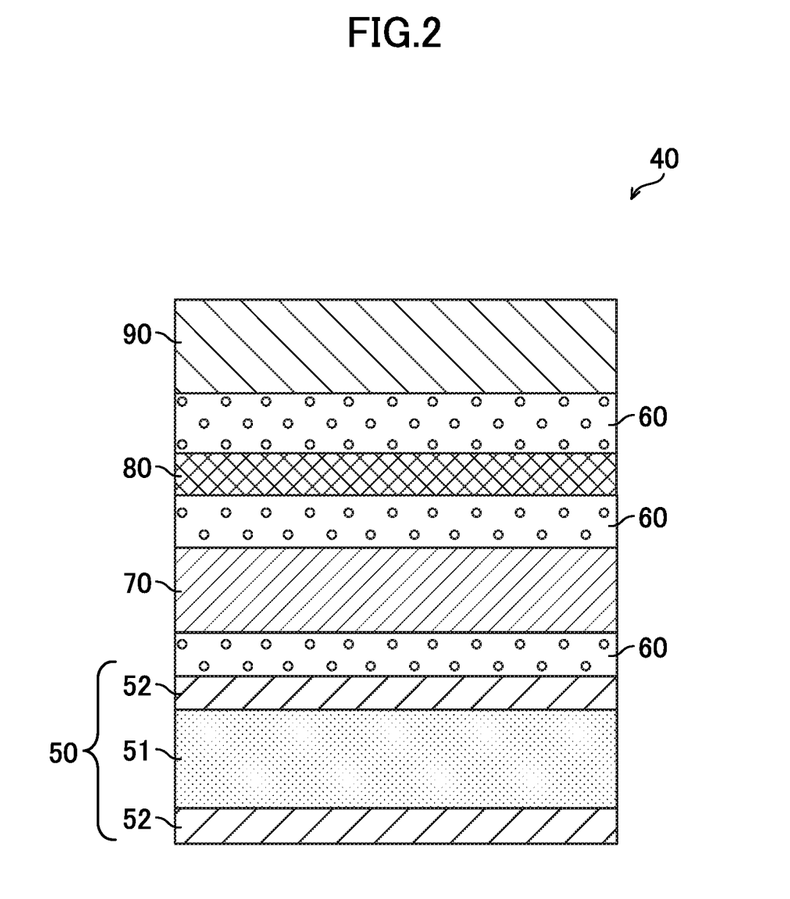
FIG. 2 is a view explaining a laminated structure of a container 40.

Next, there will be explained a laminated structure of the container 40 (laminated sheet).

FIG. 2 is a view explaining the laminated structure of the container 40. The container 40 includes an absorbing film (absorbing layer) 50 in a lowermost layer.

The absorbing film 50 is a film having a three-layer structure, and has a main absorbing layer 51 mainly playing a role of absorbing moisture and smell and skin layers 52 protecting the main absorbing layer 51. Note that an absorption function may also be provided in the skin layers 52.

The absorbing film 50 is disposed on the side where the solid preparation 20 (see FIG. 1) is held. A reinforcing layer 70 is laminated on the absorbing film 50 with an adhesive layer 60 interposed therebetween.

In this embodiment, for the main absorbing layer 51, one having as an absorbent, zeolite added to LDPE (Low-Density Polyethylene) is used. Further, for the skin layers 52, LLDPE (Linear Low-Density Polyethylene) is used. The thickness of the absorbing film 50 is 30 to 200 micrometers or so, for example. Incidentally, the absorbing film 50 does not need to have the three-layer structure, and may also have a layer constitution of one layer, two layers, or four layers or more, and the use materials are also not limited to them.

The resin and the absorbent are formed into a film shape or a sheet shape by an inflation method, a T-die method, coextrusion, or the like, which is preferably used for the absorbing film 50.

As the materials of the resins composing the main absorbing layer 51 and the skin layers 52, there can be used at least one type selected from LDPE (Low-Density Polyethylene), LLDPE (Liner Low-Density Polyethylene), PP (Polypropylene), chlorinated polypropylene, saturated polyester, EAA (Ethylene-Acrylic Acid copolymer), EMAA (Ethylene-Methacrylic Acid copolymer), EEA (Ethylene-Ethyl Acrylate copolymer), EMA (Ethylene-Methyl Acrylate copolymer), ionomer, carboxylic acid modified polyethylene, carboxylic acid modified polypropylene, carboxylic acid modified EVA, PVC (Polyvinyl Chloride), polystyrene, and so on, or a mixture of them can also be used. The resin composing the main absorbing layer 51 and the resin composing the skin layers 52 may be the same resin, or may also be the different resins.

Further, as the material of the absorbent composing the absorbing film 50, zeolite (natural zeolite, artificial zeolite, synthetic zeolite), a chemical absorbent such as calcium oxide or magnesium sulfide, a deoxidant such as oxygen-deficient cerium oxide, or the like can be used. Zeolite contains a molecular sieve, and the effective pore diameter of the molecular sieve is preferably 3 to 10 angstrom or so (0.3 to 1.0 nm or so). The effective pore diameter of the molecular sieve is selected according to the size of an object to absorb.

Further, the effective pore diameter of the above-described zeolite is preferably 3 angstrom or more (0.3 nm or more).

Zeolite can absorb moisture quickly due to its absorption speed being fast. The molecular sieve being one example of zeolite is a porous particulate material used for separating substances according to the difference in size of molecules, has a structure with uniform pores, and has a sieve effect of a king by absorbing small molecules coming into cavities of pores.

Further, the container 40 includes the reinforcing layer 70 laminated on the absorbing film 50 with the adhesive layer 60 interposed therebetween.

The reinforcing layer 70 is a layer for improving the strength of the is entire container 40, for which, for example, biaxially-oriented polyamide, PET (polyethylene terephthalate), or PVC can be used. The thickness of the reinforcing layer 70 is 15 to 60 micrometers or so, for example. Note that a plurality of layers of the reinforcing layers 70 can be provided as long as the reinforcing layer 70 has its thickness falling within an allowable range.

Further, the container 40 includes an aluminum layer 80 laminated on the reinforcing layer 70 with an adhesive layer 60 interposed therebetween.

The aluminum layer 80 is a layer for improving a barrier property of the solid preparation 20 such as a medicine, for which, for example, alloyed aluminum foil can be used. The thickness of the aluminum layer 80 is 16 to 60 micrometers or so, for example.

Further, the container 40 includes a barrier layer 90 laminated on the aluminum layer 80 with an adhesive layer 60 interposed therebetween.

The barrier layer 90 is a layer for improving the barrier property together with the aluminum layer 80 laminated below, for which, for example, biaxially-oriented polyamide or PET (Polyethylene Terephthalate) can be used. The barrier layer 90 is a layer performing the function of suppressing entry of liquid and gas. The thickness of the barrier layer 90 is 5 to 30 micrometers or so, for example.

The adhesive layer 60 plays a role of bonding each of the layers, for which, for example, a urethane-based adhesive and the like can be used.

Then, both end portions of this container 40 are fixed and a center portion of the container 40 is pressed toward the barrier layer 90 side from the absorbing film 50 side, and the container 40 is formed into a dome shape, and thereby the dome-shape container 40 (see FIG. 1) in which the barrier layer 90 becomes an outermost layer and the absorbing film 50 becomes an innermost layer is completed.

Next, the invention will be explained by citing concrete examples. Note that the invention to be disclosed is not limited to these examples and comparative examples.

Figure 3:
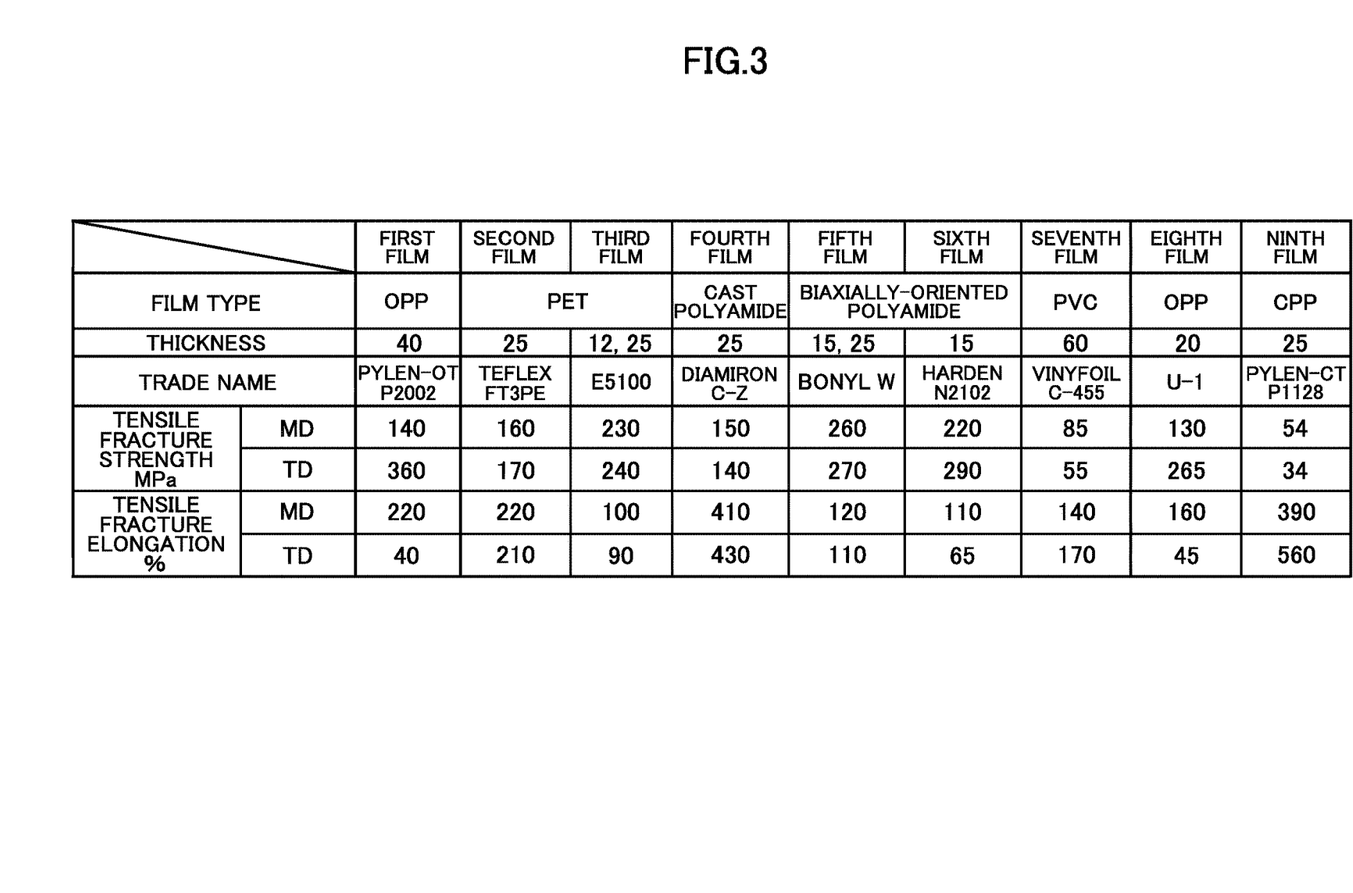
FIG. 3 is a chart showing a list of films to be used for each of materials of examples and comparative examples.

FIG. 3 is a chart showing a list of films to be used for each of materials of the examples and comparative examples.

Details of the respective films are as follows.

[First Film]
(1) Film type: OPP (Biaxially-Oriented Polypropylene)
(2) Thickness: 40 micrometers
(3) Trade name: Pylen-OT P2002 (manufactured by TOYOBO CO., LTD.; registered trademark of Japan)
(4) Tensile fracture strength $P_{MD}$: 140 MPa
(5) Tensile fracture strength $P_{TD}$: 360 MPa
(6) Tensile fracture elongation $L_{MD}$: 220%
(7) Tensile fracture elongation $L_{TD}$: 40%

Here, MD means a drawn direction and TD means a direction transverse to the drawn direction.

[Second Film]
(1) Film type: PET
(2) Thickness: 25 micrometers
(3) Trade name: Teflex-FT3PE (manufactured by Teijin DuPont Films Japan Limited; registered trademark of Japan)
(4) Tensile fracture strength $P_{MD}$: 160 MPa
(5) Tensile fracture strength $P_{TD}$: 170 MPa
(6) Tensile fracture elongation $L_{MD}$: 220%
(7) Tensile fracture elongation $L_{TD}$: 210%

[Third Film]
(1) Film type: PET
(2) Thickness: 12 micrometers or 25 micrometers
(3) Trade name: E5100 (manufactured by TOYOBO CO., LTD.; TOYOBO ESTER FILM E5100 type; registered trademark of Japan)
(4) Tensile fracture strength $P_{MD}$: 230 MPa
(5) Tensile fracture strength $P_{TD}$: 240 MPa
(6) Tensile fracture elongation $L_{MD}$: 100%
(7) Tensile fracture elongation $L_{TD}$: 90%

[Fourth Film]
(1) Film type: cast polyamide
(2) Thickness: 25 micrometers
(3) Trade name: Diamiron-C-Z (manufactured by Mitsubishi Plastics, Inc.; registered trademark of Japan)
(4) Tensile fracture strength $P_{MD}$: 150 MPa
(5) Tensile fracture strength $P_{TD}$: 140 MPa
(6) Tensile fracture elongation $L_{MD}$: 410%
(7) Tensile fracture elongation $L_{TD}$: 430%

[Fifth Film]
(1) Film type: biaxially-oriented polyamide
(2) Thickness: 15 micrometers or 25 micrometers
(3) Trade name: Bonyl-W (manufactured by KOHJIN Co., Ltd.; registered trademark of Japan)
(4) Tensile fracture strength $P_{MD}$: 260 MPa
(5) Tensile fracture strength $P_{TD}$: 270 MPa
(6) Tensile fracture elongation $L_{MD}$: 120%
(7) Tensile fracture elongation $L_{TD}$: 110%

[Sixth Film]
(1) Film type: biaxially-oriented polyamide
(2) Thickness: 15 micrometers
(3) Trade name: Harden-N2102 (manufactured by TOYOBO CO., LTD.;
registered trademark of Japan)
(4) Tensile fracture strength $P_{MD}$: 220 MPa
(5) Tensile fracture strength $P_{TD}$: 290 MPa
(6) Tensile fracture elongation $L_{MD}$: 110%
(7) Tensile fracture elongation $L_{TD}$: 65%

[Seventh Film]
(1) Film type: PVC
(2) Thickness: 60 micrometers
(3) Trade name: Vinyfoil-C-455 (manufactured by Mitsubishi Plastics, Inc.; registered trademark of Japan)
(4) Tensile fracture strength $P_{MD}$: 85 MPa
(5) Tensile fracture strength $P_{TD}$: 55 MPa
(6) Tensile fracture elongation $L_{MD}$: 140%
(7) Tensile fracture elongation $L_{TD}$: 170%

[Eighth Film]
(1) Film type: OPP
(2) Thickness: 20 micrometers
(3) Trade name: U-1 (manufactured by Mitsui Chemicals Tohcello, Inc.)
(4) Tensile fracture strength $P_{MD}$: 130 MPa
(5) Tensile fracture strength $P_{TD}$: 265 MPa
(6) Tensile fracture elongation $L_{MD}$: 160%
(7) Tensile fracture elongation $L_{TD}$: 45%

[Ninth Film]
(1) Film type: CPP (Cast Polypropylene)
(2) Thickness: 25 micrometers
(3) Trade name: Pylen-CT P1128 (manufactured by TOYOBO CO., LTD.; registered trademark of Japan)
(4) Tensile fracture strength $P_{MD}$: 54 MPa
(5) Tensile fracture strength $P_{TD}$: 34 MPa
(6) Tensile fracture elongation $L_{MD}$: 390%
(7) Tensile fracture elongation $L_{TD}$: 560%

Next, the invention will be explained by citing concrete examples of which these films are combined to form a laminated sheet (container).

Figure 4:
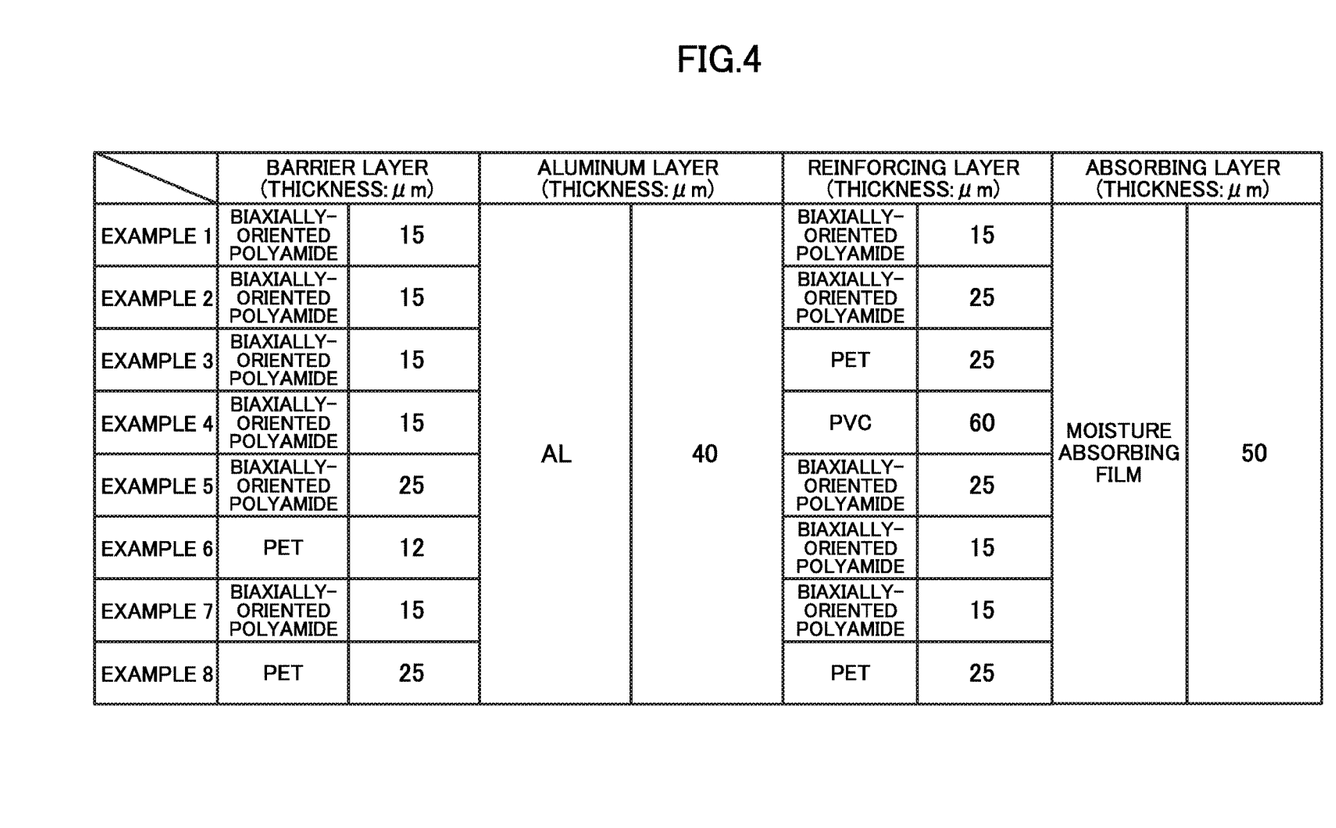
FIG. 4 is a chart showing the respective materials and values of thickness of the example.

FIG. 4 is a chart showing the material and the value of thickness of each of the layers in the example.

Example 1

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Reinforcing layer: biaxially-oriented polyamide having a thickness of 15 micrometers, (which uses the fifth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 2

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Reinforcing layer: biaxially-oriented polyamide having a thickness of 25 micrometers, (which uses the fifth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 3

(1) Barrier layer: biaxially-oriented polyamide having a thickness of 15 micrometers, (which uses the fifth film in FIG. 3)

(2) Aluminum layer: aluminum having a thickness of 40 micrometers (AL)
(3) Reinforcing layer: PET having a thickness of 25 micrometers, (which uses the second film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 4

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Reinforcing layer: PVC having a thickness of 60 micrometers, (which uses the seventh film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 5

(1) Barrier layer: biaxially-oriented polyamide having a thickness of 25 micrometers, (which uses the fifth film in FIG. 3)
(2) Aluminum layer: aluminum having a thickness of 40 micrometers (AL)
(3) Reinforcing layer: biaxially-oriented polyamide having a thickness of 25 micrometers, (which uses the fifth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 6

(1) Barrier layer: PET having a thickness of 12 micrometers, (which uses the third film in FIG. 3)
(2) Aluminum layer: aluminum having a thickness of 40 micrometers (AL)
(3) Reinforcing layer: biaxially-oriented polyamide having a thickness of 15 micrometers, (which uses the fifth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 7

(1) Barrier layer: biaxially-oriented polyamide having a thickness of 15 micrometers, (which uses the sixth film in FIG. 3)
(2) Aluminum layer: aluminum having a thickness of 40 micrometers (AL)
(3) Reinforcing layer: biaxially-oriented polyamide having a thickness of 15 micrometers, (which uses the sixth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Example 8

(1) Barrier layer: PET having a thickness of 25 micrometers, (which uses the second film in FIG. 3)
(2) Aluminum layer: aluminum having a thickness of 40 micrometers (AL)
(3) Reinforcing layer: PET having a thickness of 25 micrometers, (which uses the second film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Figure 5:
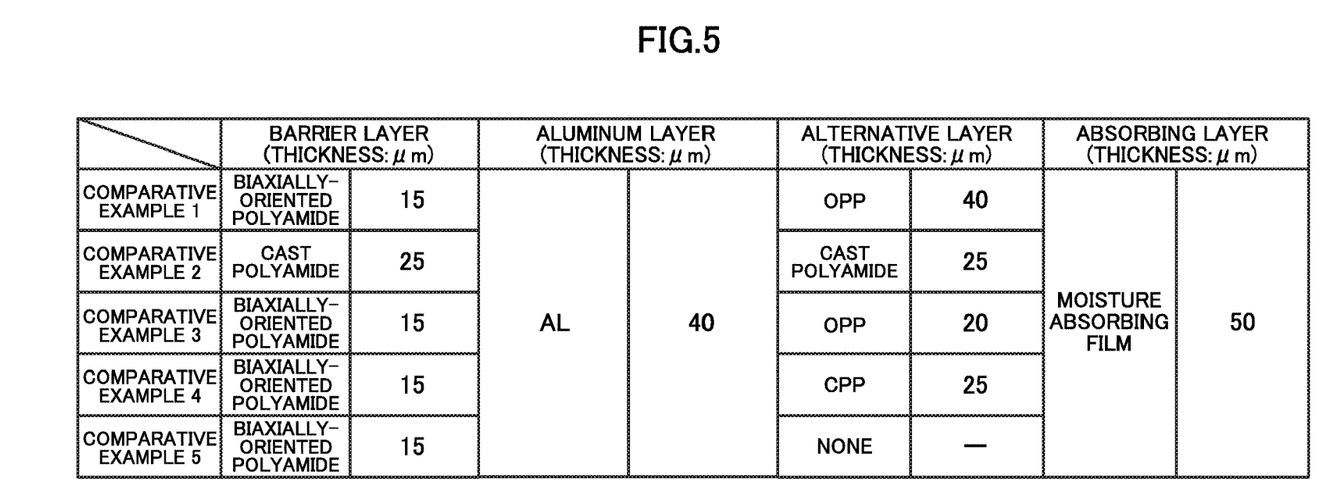
FIG. 5 is a chart showing the respective materials and values of thickness of the comparative example.

FIG. 5 is a chart showing the material and the value of thickness of each of the layers in the comparative example.

The following are details of the comparative examples. In the comparative example, an alternative layer is used in place of the reinforcing layer. Here, the alternative layer is a layer different in concept from the reinforcing layer in the example, is an alternative to the reinforcing layer in the example, and is a layer used in place of the reinforcing layer in order only to compare with each of the above-described examples. Further, the disclosed invention is not limited to the respective examples described above and the comparative examples, and the contents of the comparative examples are also not excluded from the invention.

Comparative Example 1

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Alternative layer: OPP having a thickness of 40 micrometers, (which uses the first film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Comparative Example 2

(1) Barrier layer: cast polyamide having a thickness of 25 micrometers, (which uses the fourth film in FIG. 3)
(2) Aluminum layer: aluminum having a thickness of 40 micrometers (AL)
(3) Alternative layer: cast polyamide having a thickness of 25 micrometers, (which uses the fourth film in FIG. 3)

(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Comparative Example 3

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Alternative layer: OPP having a thickness of 20 micrometers, (which uses the eighth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Comparative Example 4

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Alternative layer: CPP having a thickness of 25 micrometers, (which uses the ninth film in FIG. 3)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)

Comparative Example 5

(1) Barrier layer: biaxially-oriented polyamide having a thickness of 15 micrometers, (which uses the fifth film in FIG. 3)
(2) Aluminum layer: aluminum having a thickness of 40 micrometers (AL)
(3) Alternative layer: none (thickness 0 micrometer)
(4) Absorbing layer: a film absorbing moisture having a thickness of 50 micrometers, (which is the above-described absorbing film 50, and the layer is constituted by the layer of LLDPE (thickness; 10 micrometers), the layer of zeolite 4A being added to LDPE (thickness; 30 micrometers), and the layer of LLDPE (thickness; 10 micrometers) in order from below.)
[Evaluation Item]

Then, with regard to the examples 1 to 8 and comparative examples 1 to 5, the state at the time of forming under the following forming condition was evaluated.
[Forming Condition]
(1) Forming machine: MW-220 continuous forming machine manufactured by Kanae Co., Ltd.
(2) Plug material: PTFE (PolyTetraFluoroEthylene) based resin
(3) Plug diameter: 10 mm
(4) Target depth: 3.3 mm Here, the plug is a bar used for performing extrusion at the time of forming, and the target depth means a value indicating to what extent the container (laminated sheet) is recessed (the depth of the dome shape).
[Evaluation Result]

The containers formed into the dome shape were each observed with the naked eyes to be evaluated.

As a result, the containers in the examples 1 to 8 were able to be formed without causing cracking, fracture, and so on, particularly any trouble. Therefore, it was found that the combinations of base materials in the examples 1 to 8 are combinations making the forming possible.

On the other hand, in the containers in the comparative examples 1 to 5, there occurred problems that a ceiling portion of the container is torn through (a pocket is torn), a skirt portion of the container and a shoulder portion of the pocket are torn, and cracking is caused in the container. Therefore, it was found that the combinations of base materials in the comparative examples 1 to 5 are combinations making the forming impossible.

From the contrast between these examples and comparative examples, the following matters are obvious.

(1) The reinforcing layer and the barrier layer are formed of biaxially-oriented polyamide, thereby making the forming possible without causing cracking and so on in the container (laminated sheet).
(2) The reinforcing layer is formed of polyethylene terephthalate or polyvinyl chloride and the barrier layer is formed of biaxially-oriented polyamide, thereby making the forming possible without causing cracking and so on in the container (laminated sheet).
(3) The reinforcing layer is formed of biaxially-oriented polyamide and the barrier layer is formed of polyethylene terephthalate, thereby making the forming possible without causing cracking and so on in the container (laminated sheet).
(4) The reinforcing layer and the barrier layer are formed of polyethylene terephthalate, thereby making the forming possible without causing cracking and so on in the container (laminated sheet).

Figure 6:
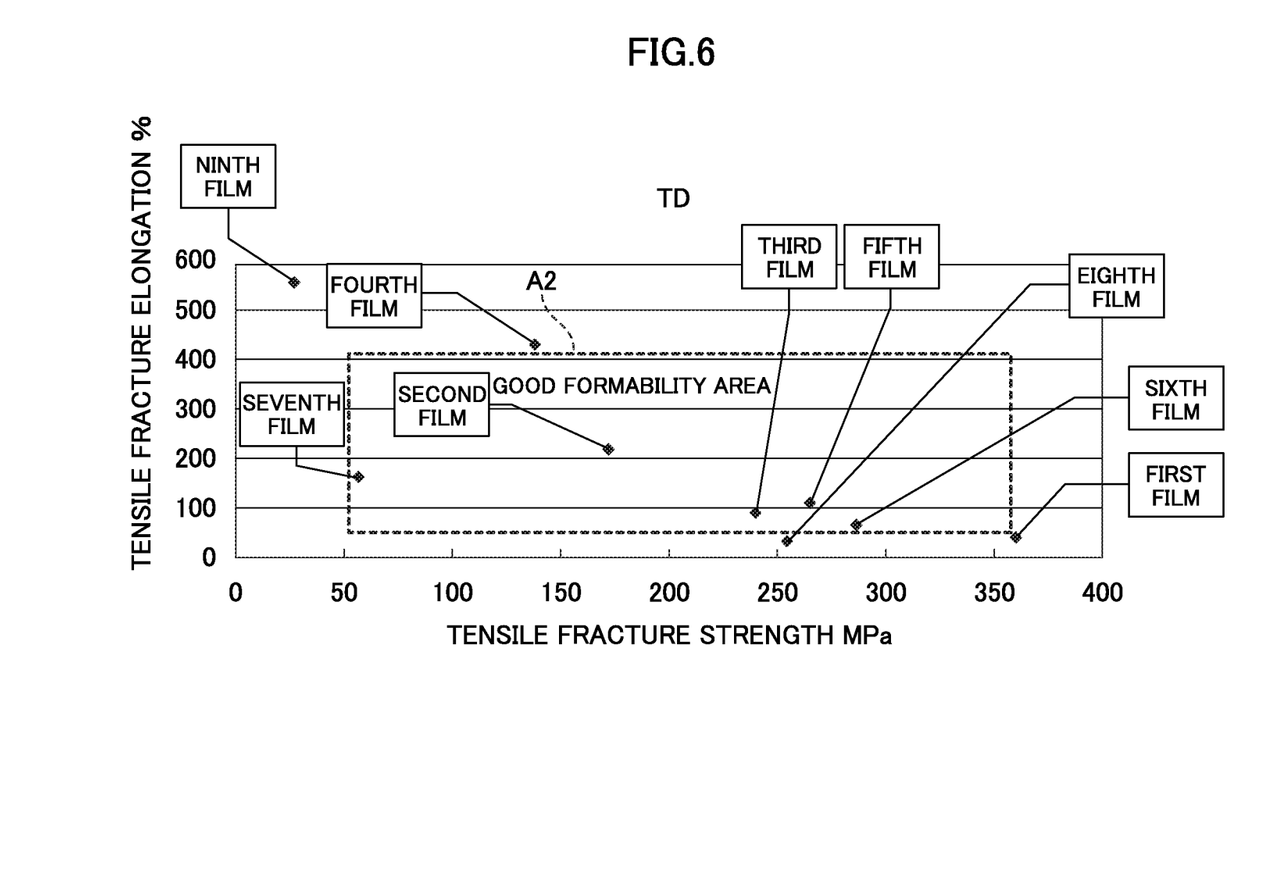
FIG. 6 is a diagram showing, of the respective films shown in FIG. 3, physical property values in a TD direction, and is a diagram showing, of the respective films, physical property values in a direction transverse to (vertical to) a drawn direction (TD).

FIG. 6 is a diagram showing physical property values, of the respective films shown in FIG. 3, in the TD direction (Transverse Direction; transverse direction).

In this diagram, the vertical axis indicates the tensile fracture elongation [%] with regard to the TD direction, and the horizontal axis indicates the tensile fracture strength [MPa] with regard to the TD direction.

In this embodiment, the evaluation is performed by using the physical property values, of each of the films, not in the MD direction (Machine Direction) but in the TD direction. This is because the formability of a PTP (Press Through Package) strongly relies on parameters in the TD direction, and has little relevance to parameters in the MD direction. That is, the reinforcing layer (a reinforcing film) is drawn in the MD direction of the film at the time of making the film and is rolled around a roll while being drawn. In the MD direction of the film, the strength is stronger than in the TD direction and is also likely to endure a load of the PTP (Press Through Package) being formed. On the other hand, in the TD direction, various factors such that drawn is made or not depending on the film occur and thus the factors to occur each differ in degree, resulting in that the strength is relatively weak. For this reason, in this embodiment, the evaluation is performed by using the physical property values in the TD direction that are likely to affect the formability of the PTP (Press Through Package).

When the tensile fracture elongation (TD) and the tensile fracture strength (TD) of each of the films in FIG. 3 are plotted on the diagram, the state shown in FIG. 6 is made.

Then, when in the state where the physical property values of the respective films are plotted, the above-described evaluation results are overlaid, a quadrangle surrounded by a dotted line in FIG. 6 (see an area A2 in the diagram) is led.

That is, in the above-described evaluation results, the comparative examples 1 to 5 in FIG. 5 are each evaluated that the forming is impossible, in which the first film, the fourth film, the eighth film, and the ninth film in FIG. 3 are used as the alternative layer used in place of the reinforcing layer. Further, in the comparative example 5, no reinforcing layer is formed.

Thus, an area led by the above-described respective examples and respective comparative examples is surrounded by a dotted line of a quadrangle, and the inside area is regarded as a good formability area.

From the quadrangular area surrounded by the dotted line, the following matters are obvious.

As for the reinforcing layer, with regard to the direction transverse to the drawn direction (TD), the tensile fracture strength $P_{TD}$ is set to fall within a range of equal to or more than 55 MPa and less than 360 MPa and the tensile fracture elongation $L_{TD}$ is set to fall within a range of more than 45% and less than 430%, and thereby the ceiling portion of the container (laminated sheet) is not torn through at the time of forming and an end portion of the skirt portion and the shoulder portion of the pocket are not torn, resulting in that the forming can be performed well.

Further, as for the reinforcing layer, with regard to the direction transverse to the drawn direction (TD), the tensile fracture strength $P_{TD}$ further preferably falls within a range of equal to or more than 55 MPa and equal to or less than 290 MPa and the tensile fracture elongation $L_{TD}$ further preferably falls within a range of equal to or more than 65% and equal to or less than 210%. As long as it is designed as above, the ceiling portion of the container (laminated sheet) is not torn through at the time of forming and the end portion of the skirt portion and the shoulder portion of the pocket are not torn, resulting in that the forming can be performed better.

Incidentally, the reason why the lower limit value of the tensile fracture strength $P_{TD}$ is set to 55 MPa is because a base material film for container having a value of the tensile fracture strength $P_{TD}$ being less than 30 MPa does not exist basically except for a special one having limited use. Then, the ninth film (the tensile fracture strength $P_{TD}$=34 MPa) is evaluated that the forming is impossible, and thus the value of the tensile fracture strength $P_{TD}$ of the seventh film (55 MPa) is set to the lower limit value of the tensile fracture strength $P_{TD}$.

On the other hand, it was found that if the numerical values of the films fall outside the range of them (outside the range of the area A2), as seen in the comparative examples 1 to 5, the ceiling portion of the container (laminated sheet) is torn through at the time of forming and the end portion of the skirt portion and the shoulder portion of the pocket are torn, resulting in that the films fall within a range where the forming is impossible.

The details leading to the above-described embodiments and examples are as follows.

The laminated sheet or container has an absorption function provided thereto, thereby being able to maintain a dry state, prevent oxidation, and absorb smell efficiently.

On the other hand, the laminated sheet or container has an aluminum layer formed therein, thereby making it possible to improve the barrier property.

However, in an embodiment in which these two techniques are simply combined, namely in an embodiment in which a barrier layer, an adhesive layer, an aluminum layer, an adhesive layer, and an absorbing layer are laminated in order from above, there are problems that when the laminated sheet is formed into a dome shape to make the container (a cavity or a recession is formed), the ceiling portion of the container is torn through and the skirt portion of the container and the shoulder portion of the pocket (a corner portion of a projection-shaped portion) are torn.

From the above background, there is desired a technique that is capable of exhibiting the barrier property while maintaining the absorbability and further in which part of the container (laminated sheet) is not torn through at the time of forming and the end portion of the container (laminated sheet) is not torn.

Here, in the laminated sheet in this embodiment, the absorbing film 50, the adhesive layer 60, the reinforcing layer 70, the adhesive layer 60, the aluminum layer 80, the adhesive layer 60, and the barrier layer 90 are laminated in order from below.

This laminated sheet is pressed toward the barrier layer 90 side from the absorbing film 50 side to be formed into a dome shape, and thereby the dome-shape container 40 in which the barrier layer 90 becomes the outermost layer and the absorbing film 50 becomes the innermost layer is completed.

In this case, in the absorbing film 50 as the innermost layer, the function of absorbing liquid and gas is exhibited, and in the two layers of the barrier layer 90 as the outermost layer and the aluminum layer 80, the barrier property (airtightness) is improved.

Furthermore, in this embodiment, the reinforcing layer 70 is formed between the absorbing film 50 and the aluminum layer 80, so that this reinforcing layer 70 makes it possible to improve the entire strength of the laminated sheet and to solve the problems that the ceiling portion of the laminated sheet is torn through at the time of forming and the end portion of the skirt portion and the shoulder portion of the pocket are torn.

The reinforcing layer 70 is preferably formed of one selected from the group consisting of biaxially-oriented polyamide, polyethylene terephthalate, and polyvinyl chloride.

As above, the material of the reinforcing layer 70 is appropriately selected, thereby making it possible to provide the high-strength and easily-formed laminated sheet.

The reinforcing layer 70 and the barrier layer 90 are preferably formed of biaxially-oriented polyamide.

As above, the reinforcing layer 70 and the barrier layer 90 are formed of biaxially-oriented polyamide, thereby making it possible to provide the high-strength and easily-formed laminated sheet.

The reinforcing layer 70 is preferably formed of polyethylene terephthalate or polyvinyl chloride, and the barrier layer 90 is preferably formed of biaxially-oriented polyamide.

As above, the reinforcing layer 70 is formed of polyethylene terephthalate and the barrier layer 90 is formed of biaxially-oriented polyamide, thereby making it possible to provide the high-strength and easily-formed laminated sheet.

The reinforcing layer 70 is preferably formed of biaxially-oriented polyamide, and the barrier layer 90 is preferably formed of polyethylene terephthalate.

As above, the reinforcing layer 70 is formed of biaxially-oriented polyamide and the barrier layer 90 is formed of polyethylene terephthalate, thereby making it possible to provide the high-strength and easily-formed laminated sheet.

The reinforcing layer 70 and the barrier layer 90 are preferably formed of polyethylene terephthalate.

As above, the reinforcing layer 70 and the barrier layer 90 are formed of polyethylene terephthalate, thereby making it possible to provide the high-strength and easily-formed laminated sheet.

As explained above, the combination of the reinforcing layer 70 and the barrier layer 90 is changed appropriately, thereby making it possible to provide the various and more practical laminated sheets.

As for the reinforcing layer 70, with regard to the direction transverse to the drawn direction, the tensile fracture strength $P_{TD}$ preferably falls within a range of equal to or more than 55 MPa and less than 360 MPa and the tensile fracture elongation $L_{TD}$ preferably falls within a range of more than 45% and less than 430%.

As for the reinforcing layer 70, with regard to the direction transverse to the drawn direction, the tensile fracture strength $P_{TD}$ further preferably falls within a range of equal to or more than 55 MPa and equal to or less than 290 MPa and the tensile fracture elongation $L_{TD}$ further preferably falls within a range of equal to or more than 65% and equal to or less than 210%.

The tensile fracture strength $P_{TD}$ and the tensile fracture elongation $L_{TD}$ of the reinforcing layer 70 are set to fall within such ranges, and thereby the ceiling portion of the laminated sheet is not torn through at the time of forming and the end portion of the skirt portion and the shoulder portion of the pocket are not torn, resulting in that the forming can be performed well.

On the other hand, when all the following conditions are fulfilled, the ceiling portion of the container (laminated sheet) is torn through at the time of forming and the end portion of the skirt portion and the shoulder portion of the pocket are torn, resulting in that the films fall within a range where the forming is impossible.
(1) The tensile fracture strength $P_{TD}$ is set to fall within a range of less than 55 MPa or equal to or more than 360 MPa.
(2) The tensile fracture elongation $L_{TD}$ is set to fall within a range of equal to or less than 45% or equal to or more than 430%.

As above, the tensile fracture strength and the tensile fracture elongation of the material used for the reinforcing layer 70 are defined to fall within the proper ranges, thereby making it possible to improve a reinforcing effect of the reinforcing layer 70.

The above-described laminated sheet is used for the container 40. For this reason, the container 40 can obtain the effect of the above-described laminated sheet.

The above-described laminated sheet and the above-described container 40 are used for the blister package 10. For this reason, according to the blister package 10, it is possible to obtain the effects of the above-described laminated sheet and container 40.

For this reason, the laminated sheet, the container 40, and the blister package 10 can maintain the absorbability by the absorbing film 50, and can secure the barrier property by the barrier layer 90 and the aluminum layer 80. Further, the laminated sheet, the container 40, and the blister package 10 can be formed in a manner to increase the entire strength by the reinforcing layer 70 formed between the absorbing film 50 and the aluminum layer 80.

The disclosed invention is not limited to the above-described embodiments and examples and can be implemented with various modifications and substitutions. Further, it goes without saying that the constitutions and materials of the laminated sheet, the container, and the package that are cited in the above-described embodiments and examples are preferred examples respectively and these are modified appropriately to thereby make the invention implementable.

The invention claimed is:

1. A blister package holding therein a solid preparation from which solifenacin succinate or 1-{[(alpha-isobutanoyloxyethoxy)carbonyl] amino methyl}-1-cyclohexaneacetic acid is excluded, the blister package comprising:
   a container having a recessed holding space holding the solid preparation therein formed therein;
   a cover covering the holding space and provided with airtightness;
   an absorbing layer provided, in said container, on a side where the solid preparation is held and absorbing at least one of liquid and gas;
   a reinforcing layer provided in said container and laminated on said absorbing layer with an adhesive layer interposed therebetween;
   an aluminum layer provided in said container and laminated on said reinforcing layer with an adhesive layer interposed therebetween; and
   a barrier layer provided in said container, laminated on said aluminum layer with an adhesive layer interposed therebetween, and suppressing entry of at least one of liquid and gas, wherein
   said reinforcing layer is disposed between said absorbing layer and said aluminum layer;
   said absorbing layer is disposed on the innermost side in the blister package formed in a dome shape;
   said reinforcing layer is not disposed on a more inner side than said absorbing layer disposed on the innermost side in the blister package formed in the dome shape, and is disposed on a more outer side than the absorbing layer disposed on the innermost side in the blister package formed in the dome shape;
   said reinforcing layer is formed of biaxially-oriented polyamide, polyethylene terephthalate, or polyvinyl chloride;
   said reinforcing layer, with regard to a direction transverse to a drawn direction has: a) a tensile fracture strength $P_{TD}$ which falls within a range of equal to or more than 55 MPa and equal to or less than 290 MPa, and b) a tensile fracture elongation $L_{TD}$ which falls within a range of equal to or more than 65% and equal to or less than 210%;
   said absorbing layer includes zeolite as an absorbent;
   the thickness of said reinforcing layer is 15 to 60 micrometers,
   the thickness of said aluminum layer is 16 to 60 micrometers,
   the thickness of said absorbing layer is 30 to 200 micrometers; and
   said zeolite contains a porous particulate material.

2. The blister package according to claim 1, wherein said reinforcing layer and said barrier layer are formed of biaxially-oriented polyamide.

3. The blister package according to claim 1, wherein
said reinforcing layer is formed of polyethylene terephthalate or polyvinyl chloride, and
said barrier layer is formed of biaxially-oriented polyamide.

4. The blister package according to claim 1, wherein
said reinforcing layer is formed of biaxially-oriented polyamide, and
said barrier layer is formed of polyethylene terephthalate.

5. The blister package according to claim 1, wherein
said reinforcing layer and said barrier layer are formed of polyethylene terephthalate.

6. The blister package according to claim 1, wherein
said absorbing layer has a three-layer structure, and has a main absorbing layer disposed at a middle layer of the three-layer structure and skin layers disposed at an upper layer and a lower layer of the three-layer structure and protecting the main absorbing layer.

7. The blister package according to claim 6, wherein
the main absorbing layer and the skin layers are formed using different resins.

8. The blister package according to claim 6, wherein
the main absorbing layer includes zeolite as an absorbent, and
the skin layers do not include zeolite.

\* \* \* \* \*